Oct. 10, 1961   J. RENDSBURG   3,004,250
FILM EXPOSURE SIGNAL
Filed Feb. 17, 1960
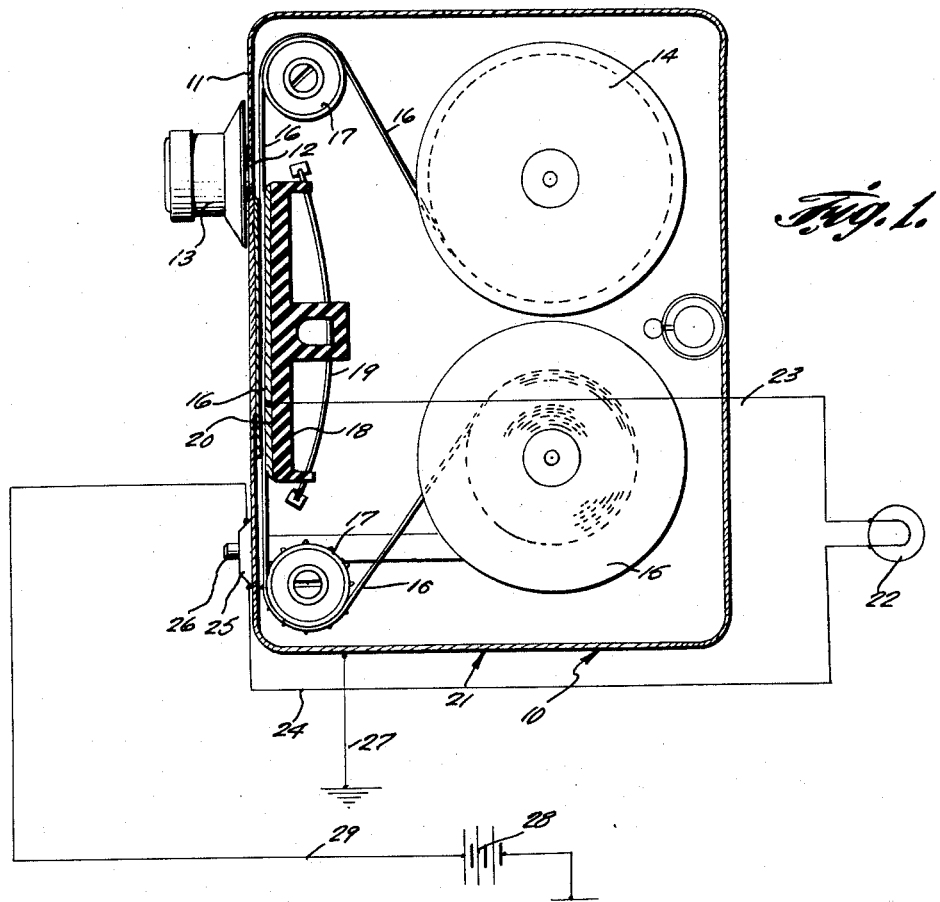
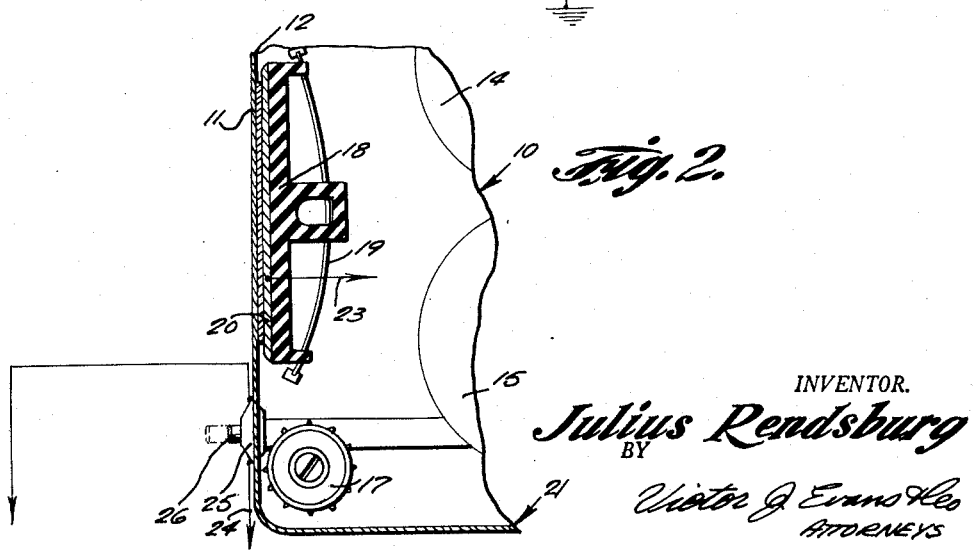
INVENTOR.
Julius Rendsburg
BY
Victor J. Evans & Co.
ATTORNEYS

United States Patent Office 3,004,250
Patented Oct. 10, 1961

3,004,250
FILM EXPOSURE SIGNAL
Julius Rendsburg, 3706 Towanda Ave., Baltimore, Md.
Filed Feb. 17, 1960, Ser. No. 9,318
5 Claims. (Cl. 340—260)

This invention relates to a motion picture camera, and more particularly to a signal for indicating when the available film has been used.

The object of the invention is to provide a film exposure signal for a camera so that after the available film has been used, a signal in the nature of a pilot light will be provided in order to indicate to the user of the camera that no more film is available.

Another object of the invention is to provide a film exposure signal for a motion picture camera which includes a visible light that will be energized or actuated upon manual depression of the camera release knob, so that when the end of the film has passed the film gate, the bulb will light up and provide an indication that all of the available film has been used.

A further object of the invention is to provide a film exposure signal which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a sectional view taken through a motion picture camera equipped with the film exposure signal of the present invention and showing the position of the parts when film is between the plate and camera wall.

FIGURE 2 is a fragmentary sectional view similar to FIGURE 1 but showing the position of the parts when there is no film between the plate and camera wall.

Referring in detail to the drawings, the numeral 10 indicates the conventional motion picture camera which includes a hollow casing or housing 21, and the housing 21 includes a front end wall 11 which is provided with a film gate or opening 12 as well as a lens 13, FIGURE 1.

The camera 10 is provided with the usual reels 14 and 15 and the numeral 16 indicates the film which is adapted to engage spools or sprockets 17.

There is provided an insulated pressure member 18 which is urged or biased toward the end wall 11 as for example by means of a spring member 19, and a plate 20 is suitably affixed or secured to the pressure member 18. As shown in FIGURE 1 for example the film 15 passes between the plate 20 and the front end wall 11.

The numeral 22 indicates a pilot light or lamp which is electrically connected to the plate 20 as at 23. The lamp or bulb 22 is electrically connected to a release knob 25 as for example by means of a conductor 24, and the release knob 25 is provided with a manually movable button 26. The housing 21 is grounded as at 27.

From the foregoing, it is apparent that there has been provided a film exposure signal for a motion picture camera such as the camera 10, and in use as long as the film 16 is available as shown in FIGURE 1, the plate 20 will be maintained away from the end wall 11 since the film 16 occupies the space between the plate 20 and end wall 11. However, when the available film has been used up, as for example as shown in FIGURE 2, the pressure member 18 will move toward the end wall 11 due to the provision of the spring member 19 so that the plate 20 will make electrical contact with the end wall 11. Then, when the push button 26 of the release knob 25 is pressed in manually, as for example from the dotted line position of FIGURE 2 to the solid line position of FIGURE 2, the electrical circuit will be completed through the wires 23 and 24 to the bulb 22 so that the bulb 22 will be energized to give a visible signal or warning to the user of the camera that all of the available film has been used up. The numeral 28 indicates a source of electrical energy such as a battery which is electrically connected in the circuit as for example to the release knob 25 by means of a conductor or wire 29, and the battery 28 is adapted to provide the electrical energy for energizing the bulb or pilot light 22.

The parts can be made of any suitable material and in different shapes or sizes.

The pressure member 18 is made of insulating material, while the plate 20 is electrically conductive, and portions of the housing 21 such as the end wall 11 are also electrically conductive in order to permit the electrical circuit to the battery to be completed when the push button 26 is manually actuated.

Thus, it will be seen that there has been provided a film exposure signal for signalling the full exposure of film in a motion picture camera by means of a light which becomes visible to the operator when the supply of available film has been used. The pressure member 18 is insulated except for the plate 20 which presses against the film where the film acts as a circuit breaker. When the end of the film has passed the gate 12, the wired pressure plate 20 makes contact against the camera wall 11. The bulb 22 will then light up as long as the push button 26 is in the in position so as to indicate that all available film has been used, and the device can be powered by a small battery such as a small pencil type of two cell battery.

What is claimed is:
1. In a camera, a hollow housing including a front end wall provided with a film gate, a manually operable release knob connected to said front end wall, reels mounted in said housing and having film trained thereover, a movable pressure member in said housing spaced from said end wall, a plate connected to said pressure member, the film adapted to pass between the plate and front end wall, and an electrical circuit including a source of electrical energy and a pilot light electrically connected to said plate and to said release knob.

2. In a camera, a hollow housing including a front end wall provided with a film gate, a manually operable release knob connected to said front end wall, reels mounted in said housing and having film trained thereover, a movable pressure member in said housing spaced from said end wall, a plate connected to said pressure member, the film adapted to pass between the plate and front end wall, and an electrical circuit including a source of electrical energy and a pilot light electrically connected to said plate and to said release knob, said release knob including a manually depressible push button.

3. The structure as defined in claim 2 and said pressure member being made of insulated material, said plate and end wall being electrically conductive.

4. In a motion picture camera including a housing, a movable pressure member of considerable size having a plate thereon, said plate being of substantially the same size as said pressure member, film adapted to pass between the plate and the adjacent portion of the housing, a release knob connected to the housing, and signal means electrically connected to the plate and release knob for providing the signal when the available film has been used, said signal means including a pilot light.

5. A camera comprising a hollow housing embodying a front end wall having a film gate, a manually operable release knob including a manually depressible push button connected to said front end wall, reels mounted in said housing and having film trained thereover, a large movable pressure member in said housing spaced from said end wall, a spring member for biasing the pressure member toward said end wall, a plate secured to the front portion of said pressure member and said plate and pressure member being of approximately the same size, the film adapted to pass between the plate and the front end wall, and an electric circuit embodying a source of electrical energy and a pilot light electrically connected to said plate and to said release knob, said plate and end wall being electrically conductive, and said pressure member being fabricated of insulated material.

References Cited in the file of this patent

UNITED STATES PATENTS

| | | |
|---|---|---|
| 988,383 | Poser | Apr. 4, 1911 |
| 2,109,373 | Landrock | Feb. 22, 1938 |
| 2,474,951 | McCoy | July 5, 1949 |